US008308567B2

(12) United States Patent
Blackburn et al.

(10) Patent No.: US 8,308,567 B2
(45) Date of Patent: Nov. 13, 2012

(54) DISCOVERY SERVICE IN A SERVICE-ORIENTED GAMING NETWORK ENVIRONMENT

(75) Inventors: Christopher W. Blackburn, Reno, NV (US); Rory L. Block, Carson City, NV (US); Thomas A. Gentles, Algonquin, IL (US); Vikram Swamy, Chicago, IL (US); Terry D. Warkentin, Carson City, NV (US)

(73) Assignee: WMS Gaming Inc., Waukegan, IL (US)

( * ) Notice: Subject to any disclaimer, the term of this patent is extended or adjusted under 35 U.S.C. 154(b) by 2142 days.

(21) Appl. No.: 10/794,423

(22) Filed: Mar. 5, 2004

(65) Prior Publication Data

US 2004/0242329 A1 Dec. 2, 2004

Related U.S. Application Data (60) Provisional application No. 60/452,264, filed on Mar. 5, 2003.

(51) Int. Cl.
*A63F 9/24* (2006.01)
(52) U.S. Cl. .......... 463/42; 434/118; 709/203; 709/204; 709/206; 709/207; 709/212; 709/216; 709/217; 709/230
(58) Field of Classification Search .................... 463/42; 434/118; 709/203, 204–207, 212, 216, 217, 709/230
See application file for complete search history.

(56) References Cited

U.S. PATENT DOCUMENTS

| 4,670,857 A | 6/1987 | Rackman |
| 5,116,055 A | 5/1992 | Tracy |
| 5,138,712 A | 8/1992 | Corbin |
| 5,280,909 A | 1/1994 | Tracy |
| 5,473,143 A | 12/1995 | Vak et al. |
| 5,638,448 A | 6/1997 | Nguyen |
| 5,671,412 A | 9/1997 | Christiano |
| 5,724,425 A | 3/1998 | Chang et al. |
| 5,790,677 A | 8/1998 | Fox et al. |
| 5,823,879 A | 10/1998 | Goldberg et al. |

(Continued)

FOREIGN PATENT DOCUMENTS

WO  WO-0148713 A1  7/2001

(Continued)

OTHER PUBLICATIONS

"U.S. Appl. No. 10/788,661, Response filed Sep. 17, 2007 to Non-Final Office Action mailed Jun. 15, 2007", 16 pgs.

(Continued)

*Primary Examiner* — David L Lewis
*Assistant Examiner* — Adetokunbo Torimiro
(74) *Attorney, Agent, or Firm* — Schwegman Lundberg & Woessner, P.A.

(57) ABSTRACT

A gaming network includes a discovery service, gaming machines and services providers. The discovery service receives service information from the service providers and publishes the service information to gaming machines and other entities on the gaming network. The discovery service and service providers may be implemented as web services with a gaming services framework. The gaming services framework comprises a set of services, protocols, XML schemas, and methods for providing gaming system functionality in a distributed, network based architecture that includes gaming machines and servers. Systems and methods provide a service-oriented framework for gaming and property management based upon internetworking technology and web services concepts.

25 Claims, 5 Drawing Sheets

U.S. PATENT DOCUMENTS

| | | | |
|---|---|---|---|
| 5,964,660 A * | 10/1999 | James et al. | 463/1 |
| 5,971,271 A | 10/1999 | Wynn et al. | |
| 6,035,397 A | 3/2000 | Campinos et al. | |
| 6,071,190 A | 6/2000 | Weiss et al. | |
| 6,135,887 A | 10/2000 | Pease et al. | |
| 6,178,510 B1 | 1/2001 | O'Connor et al. | |
| 6,183,366 B1 | 2/2001 | Goldberg et al. | |
| 6,189,146 B1 | 2/2001 | Misra et al. | |
| 6,203,010 B1 | 3/2001 | Jorasch | |
| 6,280,328 B1 | 8/2001 | Holch et al. | |
| 6,364,769 B1 | 4/2002 | Weiss et al. | |
| 6,390,917 B1 | 5/2002 | Walker et al. | |
| 6,468,155 B1 | 10/2002 | Zucker et al. | |
| 6,508,709 B1 | 1/2003 | Karmarkar | |
| 6,536,037 B1 | 3/2003 | Barrese et al. | |
| 6,615,166 B1 | 9/2003 | Guheen et al. | |
| 6,629,081 B1 | 9/2003 | Cornelius et al. | |
| 6,645,077 B2 | 11/2003 | Rowe | |
| 6,682,423 B2 | 1/2004 | Brosnan et al. | |
| 6,758,757 B2 | 7/2004 | Luciano, Jr. et al. | |
| 6,766,305 B1 | 7/2004 | Hoover et al. | |
| 6,790,142 B2 | 9/2004 | Okada et al. | |
| 6,811,486 B1 | 11/2004 | Luciano, Jr. | |
| 6,830,515 B2 | 12/2004 | Rowe | |
| 6,880,168 B2 | 4/2005 | Maehiro | |
| 6,887,154 B1 | 5/2005 | Luciano, Jr. | |
| 6,890,259 B2 | 5/2005 | Breckner et al. | |
| 6,908,391 B2 | 6/2005 | Gatto et al. | |
| 6,916,247 B2 | 7/2005 | Gatto et al. | |
| 6,922,685 B2 | 7/2005 | Greene et al. | |
| 6,935,958 B2 | 8/2005 | Nelson | |
| 6,939,234 B2 | 9/2005 | Beatty | |
| 6,945,870 B2 | 9/2005 | Gatto et al. | |
| RE38,812 E | 10/2005 | Acres et al. | |
| 6,997,803 B2 | 2/2006 | LeMay et al. | |
| 7,020,697 B1 | 3/2006 | Goodman et al. | |
| 7,025,674 B2 | 4/2006 | Adams et al. | |
| 7,039,701 B2 * | 5/2006 | Wesley | 709/224 |
| 7,043,641 B1 | 5/2006 | Martinek et al. | |
| 7,056,217 B1 | 6/2006 | Pelkey et al. | |
| 7,069,234 B1 | 6/2006 | Cornelius et al. | |
| 7,116,782 B2 | 10/2006 | Jackson et al. | |
| 7,117,349 B2 | 10/2006 | Chu et al. | |
| 7,131,909 B2 * | 11/2006 | Rowe | 463/42 |
| 7,159,007 B2 | 1/2007 | Stawikowski | |
| 7,167,844 B1 | 1/2007 | Leong et al. | |
| 7,168,089 B2 | 1/2007 | Nguyen et al. | |
| 7,179,170 B2 | 2/2007 | Martinek et al. | |
| 7,185,342 B1 | 2/2007 | Carrer et al. | |
| 7,186,181 B2 | 3/2007 | Rowe | |
| 7,188,085 B2 | 3/2007 | Pelletier | |
| 7,203,841 B2 | 4/2007 | Jackson et al. | |
| 7,237,258 B1 | 6/2007 | Pantuso et al. | |
| 7,353,274 B1 | 4/2008 | Rouhi et al. | |
| 2001/0010045 A1 | 7/2001 | Stefik et al. | |
| 2001/0014881 A1 | 8/2001 | Drummond et al. | |
| 2001/0039210 A1 | 11/2001 | St. Denis | |
| 2001/0044339 A1 | 11/2001 | Cordero et al. | |
| 2001/0053712 A1 | 12/2001 | Yoseloff et al. | |
| 2002/0013174 A1 | 1/2002 | Murata | 463/42 |
| 2002/0049909 A1 | 4/2002 | Jackson et al. | |
| 2002/0052230 A1 | 5/2002 | Martinek et al. | |
| 2002/0077178 A1 | 6/2002 | Oberberger et al. | |
| 2002/0107072 A1 | 8/2002 | Giobbi | |
| 2002/0116615 A1 | 8/2002 | Nguyen et al. | |
| 2002/0143819 A1 * | 10/2002 | Han et al. | 707/513 |
| 2002/0147049 A1 | 10/2002 | Carter, Sr. | |
| 2002/0155891 A1 | 10/2002 | Okada et al. | |
| 2002/0161868 A1 | 10/2002 | Paul et al. | |
| 2002/0165023 A1 | 11/2002 | Brosnan et al. | |
| 2002/0174160 A1 | 11/2002 | Gatto et al. | |
| 2003/0004961 A1 | 1/2003 | Slothouber et al. | 707/100 |
| 2003/0061404 A1 | 3/2003 | Atwal et al. | |
| 2003/0065805 A1 | 4/2003 | Barnes, Jr. | |
| 2003/0069074 A1 | 4/2003 | Jackson | |
| 2003/0084342 A1 | 5/2003 | Girard | |
| 2003/0087683 A1 | 5/2003 | Gatto et al. | |
| 2003/0088421 A1 | 5/2003 | Maes et al. | |
| 2003/0100369 A1 | 5/2003 | Gatto et al. | 463/42 |
| 2003/0100370 A1 | 5/2003 | Gatto et al. | 463/42 |
| 2003/0100371 A1 | 5/2003 | Gatto et al. | |
| 2003/0100372 A1 | 5/2003 | Gatto et al. | 463/42 |
| 2003/0110242 A1 | 6/2003 | Brown et al. | |
| 2003/0154399 A1 | 8/2003 | Zuk et al. | |
| 2003/0188019 A1 | 10/2003 | Wesley | |
| 2003/0208638 A1 | 11/2003 | Abrams et al. | |
| 2003/0217139 A1 | 11/2003 | Burbeck et al. | |
| 2003/0220835 A1 | 11/2003 | Barnes, Jr. | |
| 2003/0228907 A1 | 12/2003 | Gatto et al. | |
| 2003/0228910 A1 | 12/2003 | Jawaharlal et al. | |
| 2003/0229900 A1 | 12/2003 | Reisman | |
| 2004/0002385 A1 | 1/2004 | Nguyen | |
| 2004/0003039 A1 * | 1/2004 | Humphrey et al. | 709/204 |
| 2004/0015608 A1 | 1/2004 | Ellis et al. | |
| 2004/0031058 A1 | 2/2004 | Reisman | |
| 2004/0063497 A1 | 4/2004 | Gould | 463/42 |
| 2004/0087367 A1 | 5/2004 | Hendrickson | |
| 2004/0106452 A1 | 6/2004 | Nguyen et al. | |
| 2004/0106454 A1 | 6/2004 | Walker et al. | 463/42 |
| 2004/0107125 A1 | 6/2004 | Guheen et al. | |
| 2004/0127277 A1 | 7/2004 | Walker et al. | |
| 2004/0132532 A1 | 7/2004 | Brosnan et al. | |
| 2004/0142744 A1 | 7/2004 | Atkinson et al. | |
| 2004/0158471 A1 | 8/2004 | Davis et al. | |
| 2004/0193867 A1 | 9/2004 | Zimmer et al. | |
| 2004/0198496 A1 | 10/2004 | Gatto et al. | |
| 2004/0229684 A1 | 11/2004 | Blackburn et al. | |
| 2004/0235563 A1 | 11/2004 | Blackburn et al. | |
| 2004/0242328 A1 | 12/2004 | Blackburn et al. | |
| 2004/0242330 A1 | 12/2004 | Blackburn et al. | |
| 2004/0242331 A1 | 12/2004 | Blackburn et al. | |
| 2004/0243848 A1 | 12/2004 | Blackburn et al. | |
| 2004/0243849 A1 | 12/2004 | Blackburn et al. | |
| 2004/0266532 A1 | 12/2004 | Blackburn et al. | |
| 2005/0020354 A1 | 1/2005 | Nguyen et al. | |
| 2005/0027871 A1 * | 2/2005 | Bradley et al. | 709/227 |
| 2005/0032577 A1 | 2/2005 | Blackburn et al. | |
| 2005/0054445 A1 | 3/2005 | Gatto et al. | |
| 2005/0086286 A1 | 4/2005 | Gatto et al. | |
| 2005/0088980 A1 * | 4/2005 | Olkkonen et al. | 370/255 |
| 2005/0227768 A1 | 10/2005 | Blackburn et al. | |
| 2006/0059253 A1 | 3/2006 | Goodman et al. | |
| 2006/0142086 A1 | 6/2006 | Blackburn et al. | |
| 2006/0143085 A1 | 6/2006 | Adams et al. | |
| 2006/0242072 A1 | 10/2006 | Peled et al. | |
| 2007/0060381 A1 | 3/2007 | Weiss | |
| 2007/0105613 A1 | 5/2007 | Adams et al. | |
| 2007/0111787 A1 | 5/2007 | Adams et al. | |
| 2007/0123332 A1 | 5/2007 | Hishinuma et al. | |
| 2007/0123348 A1 | 5/2007 | Nozaki | |
| 2007/0123349 A1 | 5/2007 | Hishinuma et al. | |
| 2007/0128899 A1 | 6/2007 | Mayer | |
| 2007/0157315 A1 | 7/2007 | Moran | |
| 2007/0162973 A1 | 7/2007 | Schneier et al. | |

FOREIGN PATENT DOCUMENTS

| | | |
|---|---|---|
| WO | WO-03045515 A1 | 6/2003 |
| WO | WO-03045516 A1 | 6/2003 |
| WO | WO-03045517 A1 | 6/2003 |
| WO | WO-03045518 A1 | 6/2003 |
| WO | WO-2004004855 A1 | 1/2004 |

OTHER PUBLICATIONS

"U.S. Appl. No. 10/788,661 Non Final Office Action mailed Jun. 15, 2007", 11 pgs.

"U.S. Appl. No. 10/788,902 Final Office Action mailed May 17, 2007", 17 pgs.

"U.S. Appl. No. 10/788,902 Non Final Office Action mailed Nov. 21, 2006", 19 pgs.

"U.S. Appl. No. 10/788,902 Response filed Feb. 21, 2007 to Non Final Office Action mailed Nov. 21, 2006", 15 pgs.

"U.S. Appl. No. 10/788,902, Response filed Aug. 17, 2007 in response to Final Office Action mailed May 17, 2007", 13 pgs.

"U.S. Appl. No. 10/788,902, Non-Final Office Action mailed Oct. 30, 2007", OARN,18 Pages.

"U.S. Appl. No. 10/788,903 Non Final Office Action mailed Jan. 3, 2007", 21 pgs.
"U.S. Appl. No. 10/788,903 Non Final Office Action mailed Jun. 28, 2007", 16 pgs.
"U.S. Appl. No. 10/788,903 Response filed Apr. 9, 2007 to Non Final Office Action mailed Jan. 3, 2007", 22 pgs.
"U.S. Appl. No. 10/788,903, Response filed Sep. 28, 2007 to Non-Final Office Action mailed Jun. 28, 2007", 13 pgs.
"U.S. Appl. No. 10/789,957 Non Final Office Action mailed May 16, 2007", 27 pgs.
"U.S. Appl. No. 10/789,957 Response filed Aug. 16, 2007 to Non Final Office Action mailed May 16, 2007", 17 pgs.
"U.S. Appl. No. 10/794,422, Response filed Nov. 19, 2007 to Non-Final Office Action mailed Jul. 18, 2007", 11 pgs.
"U.S. Appl. No. 10/794,422 Non Final Office Action Mailed Jul. 18, 2007", 9 pgs.
"U.S. Appl. No. 10/802,699, Non-Final Office Action mailed Sep. 27, 2007", OARN,7 pgs.
"U.S. Appl. No. 10/802,700, Non-Final Office Action mailed Sep. 12, 2007", 7 pgs.
"U.S. Appl. No. 10/802,701, Response filed Oct. 25, 2007 to Final Office Action mailed Jul. 25, 2007", 9 pgs.
"U.S. Appl. No. 10/802,701 Final Office Action Mailed Jul. 25, 2007", 8 pgs.
"U.S. Appl. No. 10/802,701 Non Final Office Action mailed Jan. 3, 2007", 9 pgs.
"U.S. Appl. No. 10/802,701 Response filed May 3, 2007 to Non Final Office Action mailed Jan. 3, 2007", 12 pgs.
"U.S. Appl. No. 10/813,653 Non-Final Office Action mailed Nov. 7, 2007", OARN,13 pgs.
"U.S. Appl. No. 10/813,653, Response filed Sep. 10, 2007 to Final Office Action mailed Jun. 8, 2007", 10 pgs.
"U.S. Appl. No. 10/813,653 Final Office Action mailed Jun. 8, 2007", 11 pgs.
"U.S. Appl. No. 10/813,653 Non Final Office Action mailed Nov. 13, 2006", 10 pgs.
"U.S. Appl. No. 10/813,653 Response filed Feb. 13, 2007 to Non Final Office Action mailed Nov. 13, 2006", 13 pgs.
"U.S. Appl. No. 10/824,780 Non Final Office Action mailed May 17, 2007", 12 pgs.
"U.S. Appl. No. 10/824,780 Response filed Aug. 6, 2007 to Non Final Office Action mailed May 17, 2007", 17 pgs.
"U.S. Appl. No. 10/824,930, Non-Final Office Action Mailed Aug. 10, 2007", 13 pgs.
"U.S. Appl. No. 11/068,065, Response filed Oct. 22, 2007 to Non-Final Office action mailed May 8, 2007", 11 pgs.
"U.S. Appl. No. 11/068,065 Non Final Office Action mailed Apr. 20, 2007", 13 pgs.
"U.S. Appl. No. 11/068,065 Non Final Office Action mailed May 8, 2007", 13 pgs.
"FAQs", http://web.archive.org/web/20011024231452/http://uddi.org/faqs.html, (archived Oct. 25, 2001),10 pgs.
"UDDI: Frequently Asked Question [online]", *Microsoft*, 7 pages.
Gottschalk, K., et al., "Introduction to Web Services Architecture", *IBM Systems Journal*;41(2), (2002), 170-177.
Ogbuji, U., "Using WSDL in SOAP Applications", *IBM developerWorks*: http://web.archive.org/web/20010820205450/www-106.ibm.com/developerworks/webservices/library/ws-soap/index.html?dwzone=webservices, (Nov. 2000),5 pgs.

Prescod, P., "Second Generation Web Serviced", http://webservices.xml.com/lpt/a/915, (Feb. 6, 2002),7 pgs.
Vasudevan, V., "A Web Services Primer", http://www.xml.com/lpt/a/760, (Apr. 4, 2001),10 pgs.
"U.S. Appl. No. 10/788,661 Final Office Action mailed Apr. 10, 2008", FOAR,21 Pgs.
"U.S. Appl. No. 10/788,661 Response filed Feb. 28, 2008 to Restriction Requirement mailed Nov. 28, 2007", 11 pgs.
"U.S. Appl. No. 10/788,661, Restriction Requirement mailed Nov. 28, 2007", 4 pgs.
"U.S. Appl. No. 10/788,902 response to Non-Final Office Action Oct. 30, 2007.", 13 pgs.
"U.S. Appl. No. 10/794,422 Final Office Action mailed Feb. 15, 2008.", FOAR,11 pgs.
"U.S. Appl. No. 10/796,562, Non-Final Office Action mailed Nov. 27, 2007", OARN,7 pgs.
"U.S. Appl. No. 10/796,562, Response filed May 27, 2008 to Non Final Office Action mailed Nov. 27, 2007", 10 pgs.
"U.S. Appl. No. 10/802,537 Non-Final Office Action mailed May 23, 2008", OARN,33 pgs.
"U.S. Appl. No. 10/802,699 response to Non Final Office Action mailed Sep. 27, 2007.", 9 pgs.
"U.S. Appl. No. 10/802,699 Final Office Action mailed Jul. 9, 2008", FOAR,12 Pgs.
"U.S. Appl. No. 10/802,700 Response to Non-Final Office Action filed Mar. 12, 2008", 8 pgs.
"U.S. Appl. No. 10/802,700 Final Office Action mailed Jul. 9, 2008", FOAR,13 Pgs.
"U.S. Appl. No. 10/802,701, Response filed May 12, 2008 to Non Final Office Action mailed Feb. 11, 2008", 10 pgs.
"U.S. Appl. No. 10/802,701 Non-Final Office Action mailed Feb. 11, 2008.", OARN,13 pgs.
"U.S. Appl. No. 10/813,653 response to Non-Final office Action mailed Nov. 7, 2007.", 11 pgs.
"U.S. Appl. No. 10/824,930 Final Office Action mailed Mar. 24, 2008.", FOAR,17 pgs.
"U.S. Appl. No. 10/824,930 response filed Dec. 10, 2007 to Office Action Mailed Aug. 10, 2007.", 15 pgs.
"U.S. Appl. No. 10/824,931, Non-Final Office Action mailed Mar. 21, 2008", 13.
"U.S. Appl. No. 10/824,945 Non-Final Office Action mailed Feb. 26, 2008", OARN,15 pgs.
"U.S. Appl. No. 11/068,065, Non-Final Office Action mailed Apr. 22, 2008", OARN,16.
"U.S. Appl. No. 11/068,065 response to Final Office Action mailed Jan. 9, 2008.", 11 pgs.
"U.S. Appl. No. 10/788,903, Final Action Action Mailed Dec. 31, 2007", 16Pages.
"U.S. Appl. No. 11/068,065 Final Office Action mailed Jan. 9, 2008", FOAR,15 pgs.
"UDDI: Frequently Asked Questions [online]", *Microsoft*, <http://www.microsoft.com/windowsserver2003/evaluation/overview/dotnet/uddifaq.mspx>,(Dec. 4, 2002).
"U.S. Appl. No. 10/824,780 Final Office Action mailed May 30, 2008", FOAR,19 pgs.
Sabbouh, M., et al., "World Wide Web Consortium", *Workshop on Web Services*, (Apr. 2001),3.

* cited by examiner

DISCOVERY SERVICE IN A SERVICE-ORIENTED GAMING NETWORK ENVIRONMENT

CROSS-REFERENCE TO RELATED APPLICATIONS

This application claims the benefit of U.S. Provisional Patent Application Ser. No. 60/452,264, entitled "DISCOVERY SERVICE IN A SERVICE-ORIENTED GAMING NETWORK ENVIRONMENT", filed Mar. 5, 2003; and is related to U.S. patent application Ser. No. 10/788,903, entitled "A SERVICE-ORIENTED GAMING NETWORK ENVIRONMENT", filed on Feb. 26, 2004 and assigned to the same assignee as the present application; each of which are hereby incorporated by reference herein for all purposes.

FIELD

The present invention relates generally to software and hardware systems for gaming machines, and more particularly to providing a discovery service in a service-oriented gaming network environment.

BACKGROUND

Today's gaming terminal typically comprises a computerized system controlling a video display or reels that provide wagering games such as video and mechanical slots, video card games (poker, blackjack etc.), video keno, video bingo, video pachinko and other games typical in the gaming industry. In addition, support computing systems such as accounting, player tracking and other "back office" systems exist in order to provide support for a gaming environment.

In order to prevent players from becoming bored, new versions of wagering games, and alterations to existing games are constantly being developed. In the past, the game software and content for gaming terminals and back office systems have been developed using proprietary or closed hardware, operating systems, application development systems, and communications systems. Sometimes these systems are provided by a single vendor.

Unfortunately, due to the proprietary and closed nature of existing architectures, it can be difficult to develop new games, and it is difficult to add gaming services to existing proprietary game architectures and gaming network architectures. As a result, the cost and time associated with updating and adding new gaming services to gaming networks is relatively high.

In view of the above-mentioned problems and concerns, there is a need in the art for the present invention.

SUMMARY

The above-mentioned shortcomings, disadvantages and problems are addressed by the present invention, which will be understood by reading and studying the following specification.

One aspect of the systems and methods relates to a Gaming Services Framework using the World Wide Web and internetworking technology. The World Wide Web ("Web" from here on) is a networked information system comprising agents (clients, servers, and other programs) that exchange information. The Web and networking architecture is the set of rules that agents in the system follow, resulting in a shared information space that scales well and behaves predictably. A further aspect relates to providing a discovery service in a gaming network.

The Gaming Services Framework comprises a set of services, protocols, XML schemas, and methods for providing secure gaming system functionality in a distributed, network based architecture. It is intended to be a service-oriented framework for gaming and property management based upon internetworking technology and web services concepts. Specifically, it supports a loosely coupled architecture that consists of software components that semantically encapsulate discrete functionality (self contained and perform a single function or a related group of functions—the component describes its own inputs and outputs in a way that other software can determine what it does, how to invoke its functionality, and what result to expect). These components are distributed and programmatically accessible (called by and exchange data with other software) over standard internetworking protocols (TCP/IP, HITP, DNS, DHCP, etc.).

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The present invention is directed to a service-oriented framework for gaming networks that allows for the interoperability of the software components (regardless of manufacturer, operating system, or application) reducing the dependence on a closed-system, single vendor solutions and allowing for variety in innovation and competition.

The following detailed description is, therefore, not to be taken in a limiting sense, and the scope of the present invention is defined only by the appended claims.

Operating Environment

Figure 1:
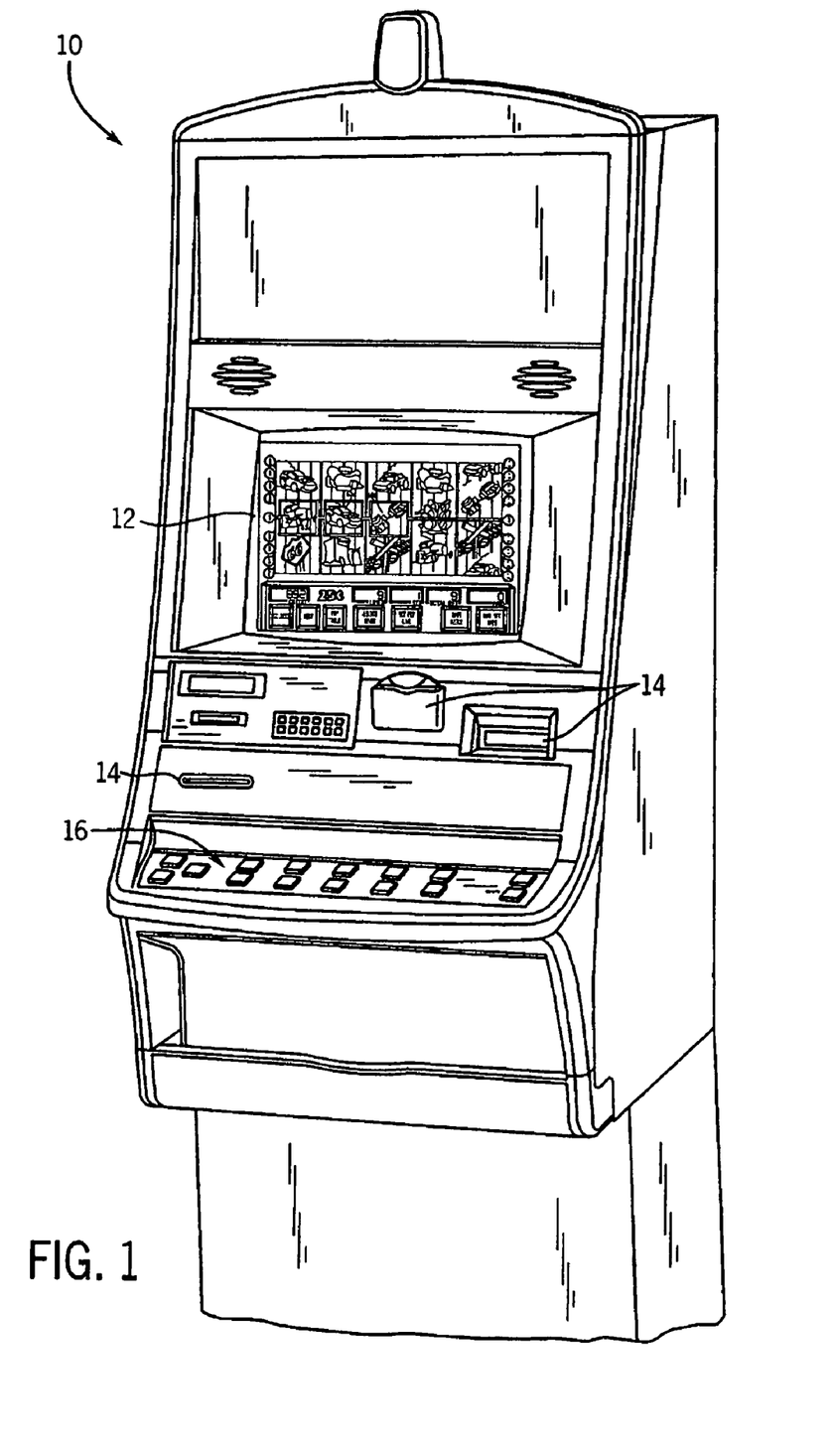
FIG. 1 is a perspective view of an exemplary gaming machine incorporated in the present invention.

FIG. 1 illustrates an exemplary gaming machine 10 in which embodiments of the invention may be implemented. In some embodiments, gaming machine 10 is operable to conduct a wagering game. These wagering games may include reel based games such as video or mechanical slot machine games, card based games such as video poker, video dice games (e.g. a Yahtzee® like dice game) or other types of wagering games typical in the gaming industry. If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a "help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Additionally, in the case of video poker, the touch screen may implement a card identification function to indicate which cards a player desires to keep for the next round. Other possible user interface devices include a keyboard and a pointing device such as a mouse or trackball.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the processor awards the player with a number of credits associated with the winning outcome.

Figure 2:
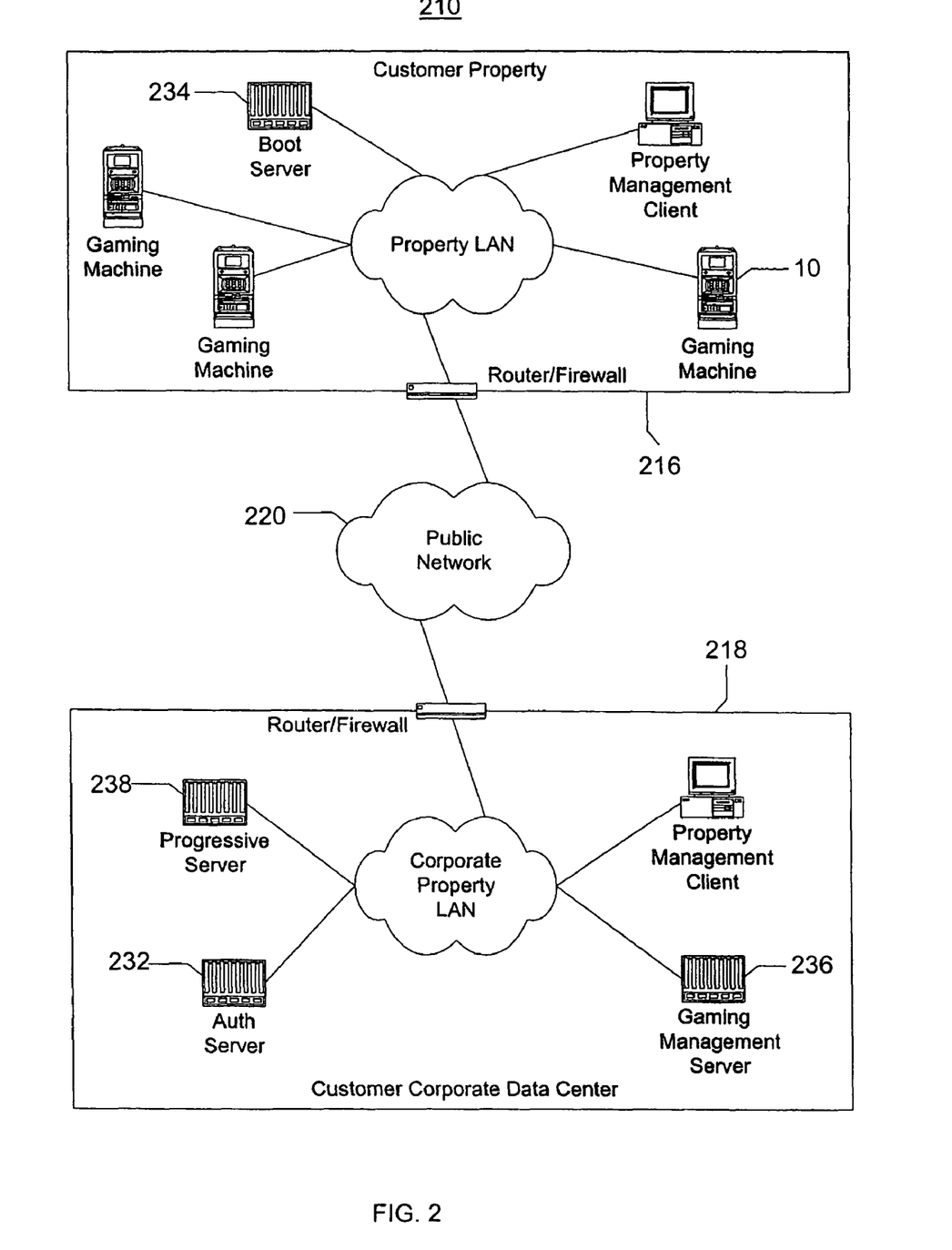
FIG. 2 is a block diagram providing an example of a service-oriented network for distributed management in a gaming environment.

FIG. 2 illustrates an example of a Gaming Service Network 210 comprising a customer data center 218 and a customer property 216. The data center 218 and customer property 216 are connected via a network 220. In some embodiments, network 220 is a public network such as the Internet. However, in alternative embodiments, private networks, including corporate intranets or extranets may be used to connect a data center 218 with one or more properties 216.

In some embodiments, the Customer Corporate Data Center 218 contains the bulk of the network servers supporting gaming properties owned by the corporation. Major elements of the gaming service network include Auth server 232, Gaming Management Server 236, and Progressive Server 238. In some embodiments, Auth Server 232 provides authentication, authorization and content integrity for client devices attempting to interact with other servers and services in the architecture.

In some embodiments, the Gaming Management Server 236 includes the following services: Boot Service, Name Service, Time Service, Game Management Service, Game Update Service, Event Management Service, Accounting Service, and Discovery Service.

In some embodiments, the Progressive Server 238 hosts a value-add service that allows a gaming machine to participate within a progressive gaming offering. Any value-add service can be added or substituted for this server/service. A progressive game offering is provided as an example. Other value-add services can be distributed on existing servers or reside on a newly added server.

The Customer Property 216 contains gaming machines 10, which in some embodiments allow remote updates and configuration through a network interface on the gaming machine. In some embodiments, a Boot Server 234 contains a DHCP service that facilitates the distribution of IP addressing to the gaming machines 10. It should be noted that any device capable of supporting a wagering game could be substituted for gaming machine 10. For example, a personal or laptop computer executing a wagering game may participate in the gaming network using the services described below.

As noted above, various services may be located throughout the gaming network. In some embodiments of the invention, a set of core operational services may include one or more of the following services:

| | |
|---|---|
| Boot Service | Provides dynamic IP addressing to devices upon boot (start-up). Typically supported by Dynamic Host Configuration Protocol (DHCP). |
| Discovery Service | Provides the address information of the server containing the service when prompted by the requestor as well as the service description, binding and location on the server. |
| Authentication Service | Contains the master Authentication Database. Authenticates the service user before allowing the use of services in the Gaming Services Framework. |
| Authorization Service | Contains the master Authorization Database. Authorizes the use of services in the Gaming Services Framework by a service requestor. |
| Gaming Management Service | Provides the ability to configure and monitor gaming machines and other services from a central location. |
| Name Service | Provides name resolution service to enable machines in a gaming network to refer to each other by name instead of IP Address. In some embodiments the name service is implemented using the Domain Naming System (DNS) protocol. |
| Time Service | Provides global synchronization of time in the gaming network. This may be implemented by running the Network Time Protocol (NTP) client software on gaming machines. |

Further details on a discovery service implemented in various embodiments of the invention are provided below with reference to FIGS. 5A and 5B.

In addition to or instead of the core services described above, some embodiments of the invention include one or more of the following services referred to as Basic Gaming Services:

| | |
|---|---|
| Accounting Service | Provides logging of transaction records for billing and general tracking purposes. |
| Event Management Service | Logs events occurring at client and server machines. |
| Game Update Service | Provides dynamic distribution of new or updated game content to gaming machines. |
| Message Director Service | This service uses a software-configurable message routing application to facilitate the reliable exchange of data messages among multiple application processes within one or more gaming systems. |
| Content Integrity Service | This service provides the ability to verify the integrity of software components running in the gaming network. This includes the verification of software versions running on gaming machines, peripherals, services as well the detection of tampering or modification of the software. |

As noted above, a gaming service network may include Value Add Services. These services include participation services and player services. Examples of participation services that may be included in various embodiments of the invention include the following:

| | |
|---|---|
| Progressive Service | Provides functionality for a gaming machine to participate within a single progressive or multiple progressives. Further details on the progressive service described above are provided below with reference to FIGS. 5A and 5B. |
| Wide Area Disruption Progressive Service | This service takes over the processing of wide area progressives at each gaming site in the event that there is no connection with a central system or the connection with the central system is temporarily disabled. |
| Mobile Gaming Device GPS Service | This service processes the GPS location of gaming machines compared with coordinates of a gaming jurisdiction. Example: players can ride a bus and begin gambling on the bus when the bus crosses into the gaming jurisdiction. |

Examples of Player Services that may be included in various embodiments of the invention include:

| | |
|---|---|
| Player Tracking Service | This service provides the operator and player with standard player tracking applications such as monitoring card in/card out transactions to track play and award player points for play, providing targeted promotional compensation to specific players, publishing account status to the player or operator, providing temporary gaming machine locking in order to hold the machine for the player for short periods of time, and providing operators and players an interface and capability for Responsible Gaming Initiatives. |
| Game Theme Location Service | This service provides location information to clients regarding specific games, game themes or vendor brands. The service may publish the information by casino, by area, by city, by state, by region, by country, or by continent depending on the input parameters provided. An example would be to publish where all of the progressive games of a particular theme (e.g., "Monopoly Money) are located in a particular hotel (e.g., the Reno Hilton) in Reno, Nevada. |
| Personalization Service | This service provides the gaming player with a more personalized gaming environment. Example: the player could choose to see text in Chinese, could choose to be reminded of dinner reservation time, could customize machine graphics, or could have a portion of his coin in go to his football club's progressive. |
| Cashless Transaction Service | This service provides the ability for a player to transfer funds between financial institutions, in-house accounts and gaming machines. |
| Bonusing Service | This service provides the ability for casinos to set up bonus games for a specific gaming machine, carousel of machines or one or more game themes. |
| Game Service | This service is a server-side process that provides the outcome of game play. This service may be used to enable Internet/online gaming. |
| Advertising Service | This service allows the operator to display advertising information to players in multimedia format as well as simple audio and graphic formats. |
| Property Service | This is a group of services that provides the ability for the property management company to integrate with gaming systems. It can provide interaction with functions such as hotel and restaurant reservations. |

It should be noted that with the distributed architecture of the Gaming Service Network 210, the above-described services that reside on network servers are not limited to location and can reside anywhere the network supports. For example, it is desirable to consider security and network latency when locating services.

Figure 3:
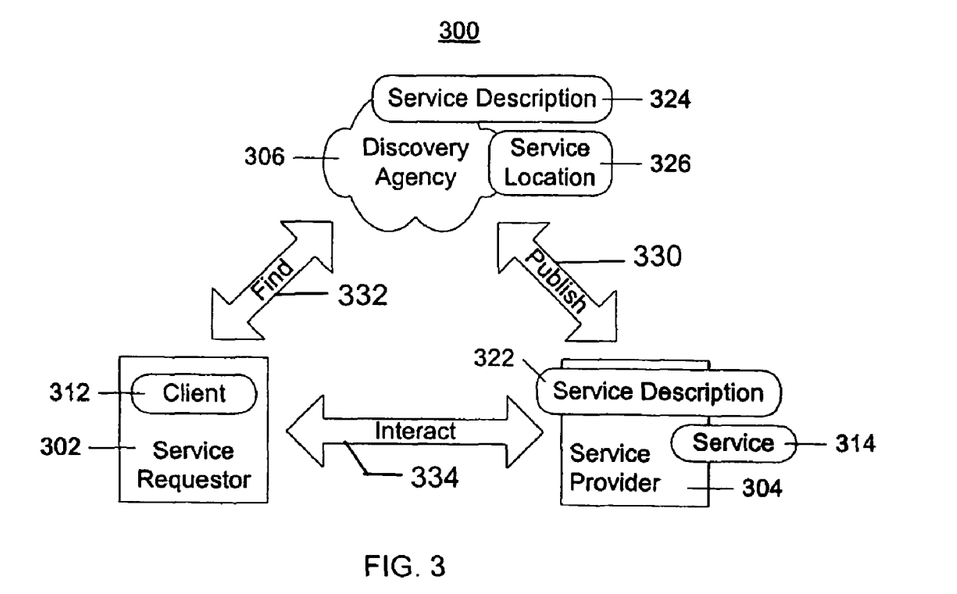
FIG. 3 is a block diagram providing a general description of service-oriented discovery and interaction.

FIG. 3 is a block diagram of a Gaming Services Framework 300 according to various embodiments of the invention. In some embodiments, the Gaming Services Framework 300 includes a set of protocols, XML schemas, and methods for providing gaming system functionality in a distributed, network-based architecture such as the network described above in FIG. 2. In order to participate in such network-based architectures, the participating machines are interconnected via public or private networks that may be wired or wireless networks. Further, devices performing service communication support a common services protocol stack such as the Gaming Services Protocol Stack that is further described below.

The Gaming Services Framework 300 provides for the interaction of several logical elements as depicted in FIG. 3. Logical elements represent the fundamental entities that interact to implement a service. In some embodiments, these logical elements include Service Requestor 302, Service Provider 304, and Discovery Agency 306. In general terms, the roles these elements play are as defined in Web Services Architecture—W3C Working (Draft 14 November 2002 and later versions). Further details on these elements are provided below.

Logical elements may reside in a number of different physical devices as part of delivering any service. For example, a Service Provider 304 will typically reside in a slot accounting or player tracking system and the Service Requestor 302 will typically reside in a gaming machine. However, there may be scenarios where it would be advantageous or appropriate for the logical elements to reside in other physical devices. For example, in alternative embodiments a Service Requestor 302 may reside in a slot accounting system.

Service Provider 304 comprises a platform that hosts access to a service 314. A service provider may also be referred to as a service execution environment or a service container. Its role in the client-server message exchange patterns is that of a server.

Service Requestor 302 comprises an application that is looking for and invoking or initiating an interaction with a service such as that provided by service provider 304. Its role in the client-server message exchange patterns is that of a client 312.

Discovery Agency 306 comprises a searchable set of service descriptions where service providers 304 publish their service description(s) 324 and service location(s) 326. The service discovery agency 306 can be centralized or distributed. A discovery agency 306 can support both patterns where service descriptions 322 are sent to discovery agency 306 and patterns where the discovery agency 306 actively inspects public service providers 304 for service descriptions 322. Service requestors 302 may find services and obtain binding information (in the service descriptions 324) during development for static binding, or during execution for dynamic binding. In some embodiments, for example in statically bound service requesters, the service discovery agent may be an optional role in the framework architecture, as a service provider 304 can send the service description 322 directly to service requestor 302. Likewise, service requestors 302 can obtain a service description 324 from other sources besides a discovery agency 306, such as a local file system, FTP site, URL, or WSDL document.

Figure 4:
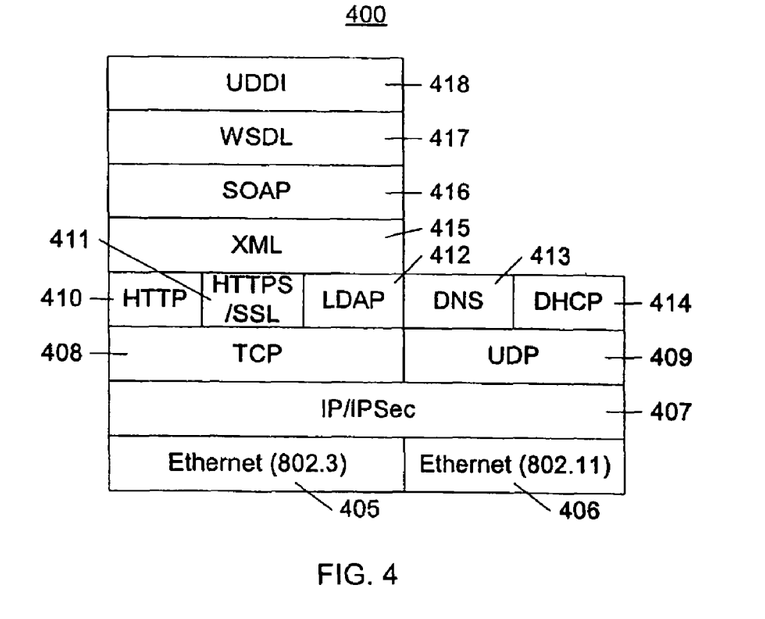
FIG. 4 is a representation of a Gaming Services Protocol Stack according to embodiments of the invention.

FIG. 4 provides a block diagram of a Gaming Services Protocol Stack 400 according to embodiments of the invention. In some embodiments, the protocol stack includes core layers that define basic services communication and transport, and are typically implemented uniformly. Higher layers that define strategic aspects of gaming processes are also described below. FIG. 4 illustrates both the widely implemented core layers and in addition illustrates the higher gaming services oriented layers of the protocol stack.

Core Layers of the Gaming Services Protocol Stack 400

In some embodiments, the gaming services framework utilizes common Internet protocols, which may include web services protocols. Although not specifically tied to any transport protocol, it is desirable to build the gaming services on ubiquitous Internet connectivity and infrastructure to ensure nearly universal reach and support. In some embodiments, gaming services will take advantage of Ethernet 405 or 406, Transmission Control Protocol (TCP) 408, Internet Protocol (IP) 407, User Datagram Protocol (UDP) 409, HyperText Transfer Protocol (HTTP) 410, HyperText Transfer Protocol Secure/Secure Socket Layer (HTTPS/SSL) 411, Lightweight Directory Access Protocol (LDAP) 412, Domain Naming System (DNS) 413, and Dynamic Host Configuration Protocol (DHCP) 414 layers in the protocol stack 400. Those of skill in the art will appreciate that other protocol layers performing equivalent functionality may be substituted for those described above and are within the scope of the present invention.

In some embodiments, service request and response data are formatted using Extensible Markup Language (XML) 415. XML 415 is a widely accepted format for exchanging data and its corresponding semantics. XML is a fundamental building block used in layers above the Common Internet Protocols. In some embodiments, the Gaming Services Protocol Stack 400 incorporates this protocol in accordance with the World Wide Web Consortium (W3C) XML Working Group's XML specification. However, those of skill in the art will appreciate that other data exchange formats may be substituted for XML 415, and such formats are within the scope of the present invention.

In some embodiments of the invention, the gaming service protocol stack 400 utilizes the Simple Object Access Protocol (SOAP) 416. SOAP 416 is a protocol for messaging and RPC (Remote Procedure Call) style communication between applications. SOAP is based on XML 415 and uses common Internet transport protocols like HTTP 410 to carry data. SOAP 416 may be used to define a model to envelope request and response messages encoded in XML 415. SOAP 416 messaging can be used to exchange any kind of XML 415 information. SOAP 416 is used in some embodiments as the basic standard for carrying service requests/responses between service users and providers. SOAP 416 has been submitted to the World Wide Web Consortium (W3C) standards body as recommendation documents (versions 1.1 and 1.2) and will likely emerge as "XML Protocol (XP)."

Higher Layers of the Gaming Services Protocol Stack 400

In some embodiments, the gaming services protocol stack includes a Web Services Description Language (WSDL) 417 and a Universal Description, Discovery, and Integration (UDDI) 418. WSDL 417 comprises a description of how to connect to a particular service. In some embodiments, WSDL 417 is based on XML. A WSDL 417 description abstracts a particular service's various connection and messaging protocols into a high-level bundle and forms an element of the UDDI 418 directory's information. WSDL 417 is similar to CORBA or COM IDL in that WSDL 417 describes programmatic interfaces. WSDL 417 is typically independent of the underlying service implementation language or component model, and focuses on an abstract description. The Gaming Services Protocol Stack 400 incorporates this description in accordance with the World Wide Web Consortium (W3C)

Web Services Description Language (WSDL) 1.1—W3C Note 15 Mar. 2001 and later versions.

In some embodiments, UDDI 418 represents a set of protocols and a public directory for the registration and real-time lookup of services. UDDI 418 enables an entity such as a company to publish a description of available services to the registry, thereby announcing itself as a service provider. Service users can send requests conforming to the UDDI 418 schema as SOAP 416 messages to the service registry to discover a provider for services. Some embodiments of the present invention may utilize UDDI Version 3, released in July of 2002 and later versions. Further development of UDDI 418 is managed under the auspices of the OASIS (Organization for the Advancement of Structured Information Standards) UDDI Specifications technical committee.

Returning to FIG. 3, the service requesters and service providers use the above-described protocol stack to perform service interactions with one another. The service interactions include publish 330, discover (find) 332, and interact 334.

Publish interaction 330 provides a mechanism for a service to be made accessible by other entities in the gaming network environment. In order to be accessible, a service needs to publish its description such that the requestor can subsequently find it. Where it is published can vary depending upon the requirements of the application. A service description 322 can be published using a variety of mechanisms known in the art. The various mechanisms used by the varying embodiments of the invention provide different capabilities depending on how dynamic the application using the service is intended to be. The service description may be published to multiple service registries using several different mechanisms. The simplest case is a direct publish. A direct publish means the service provider sends the service description directly to the service requester. In this case the service requester may maintain a local copy of the service description 322.

Another means of publishing service descriptions utilized in alternative embodiments of the invention is through a UDDI registry. There are several types of UDDI registries known in the art that may be used depending on the scope of the domain of Web services published to it. When publishing a Web service description to a UDDI registry, it is desirable to consider the business context and taxonomies in order for the service to be found by its potential service consumers. Examples of UDDI registries used in the gaming service architecture of various embodiments of the invention are Internal Enterprise Application UDDI registry, Portal UDDI registry, and Partner Catalog UDDI registry.

An Internal Enterprise Application UDDI registry may be used in some embodiments for gaming services intended for use within an organization for internal enterprise applications integration. For example, all services that provide gaming and gaming management to devices within a casino or casino organization may be published to an Internal Enterprise Application UDDI registry.

A Portal UDDI registry may be used in some embodiments for gaming services that are published by a company for external partners to find and use. A portal UDDI registry typically runs in the service provider's environment outside of a firewall or in a DMZ (demilitarized zone) between firewalls. This kind of private UDDI registry generally contains only those service descriptions that a company wishes to provide to service requesters from external partners through a network. For example, these services may be used to provide online gaming to customers connecting through the World-Wide Web.

A Partner Catalog UDDI registry may be used in some embodiments for gaming services to be used by a particular company. The Partner Catalog UDDI registry can be thought of as a rolodex like UDDI registry. A Partner Catalog UDDI registry is typically located on a computer or gaming machine behind a firewall. This kind of private UDDI registry typically contains approved, tested, and valid service descriptions from legitimate (e.g. authorized) business partners. The business context and metadata for these services can be targeted to the specific requestor. In some embodiments, this type of registry may be used for inter-casino services as well as interactions between casinos and other types of organizations such as regulators and financial institutions. It is desirable that an appropriate authorization and qualification procedure be in place to insure that only approved services are published to service repositories.

In the discover interactions 332 (also referred to as find interactions), the service requestor retrieves a service description directly or queries the registry for the type of service required. It then processes the description in order to be able to bind and invoke it.

As with publishing service descriptions, acquiring service descriptions may vary depending on how the service description is published and how dynamic the service application is meant to be. In some embodiments, service requestors may find Web services during two different phases of an application lifecycle—design time and run time. At design time, service requestors search for web service descriptions by the type of interface they support. At run time, service requesters search for a web service based on how they communicate or qualities of service advertised.

With the direct publish approach noted above, the service requester may cache the service description at design time for use at runtime. The service description may be statically represented in the program logic, stored in a file, or in a simple, local service description repository.

Service requestors can retrieve a service description at design time or runtime from a Web page (URL), a service description repository, a simple service registry or a UDDI registry. The look-up mechanism typically supports a query mechanism that provides a find by type of interface capability (for example, based on a WSDL template), the binding information (i.e. protocols), properties (such as QOS parameters), the types of intermediaries required, the taxonomy of the service, business information, etc.

The various types of UDDI registries, including those described above, have implications on the number of runtime binding services can choose from, policy for choosing one among many, or the amount of pre screening that will be done by the requester before invoking the service. Service selection can be based on binding support, historical performance, quality of service classification, proximity, or load balancing. It is desirable that an appropriate authorization and qualification procedure be in place to insure that only approved services are published to service repositories.

Once a service description is acquired, the service requester will need to process it in order to invoke the service. In some embodiments, the service requestor uses the service description to generate SOAP requests or programming language specific proxies to the service. The generation of such requests can be done at design time or at runtime to format an invocation to the service. Various tools can be used at design time or runtime to generate programming language bindings from interface descriptions, such as WSDL documents. These bindings present an API (Application Program Interface) to the application program and encapsulate the details of the messaging from the application.

After a service has been published 330 and discovered 332, the service may be invoked so that a service requestor and service provider may interact 334. In the interact operation 334, the service requestor invokes or initiates an interaction with the service at runtime using the binding details in the service description 322 to locate, contact, and invoke the service. Examples of service interactions 334 include: single message one way, broadcast from requester to many services, a multi message conversation, or a business process. Any of these types of interactions can be synchronous or asynchronous requests.

In some embodiments of the invention, security mechanisms may be used to secure the Gaming Services Framework 300. Securing the Gaming Services Framework typically involves providing facilities for ensuring the integrity and confidentiality of the messages and for ensuring that a service acts only on requests in messages that express the claims required by policies. Examples of such mechanisms used in various embodiments of the invention include IPSec and SSL/TLS, which provide network and transport layer security between two endpoints. However, when data is received and forwarded on by an intermediary beyond the transport layer both the integrity of data and any security information that flows with it maybe lost. This forces any upstream message processors to rely on the security evaluations made by previous intermediaries and to completely trust their handling of the content of messages. Thus it is desirable to include security mechanisms that provide end-to-end security. It is also desirable that such mechanisms be able to leverage both transport and application layer security mechanisms to provide a comprehensive suite of security capabilities.

Discovery Service

In general, the various embodiments of the invention implement a discovery service for a gaming network and act as a repository for holding information pertaining to other web services and the business information that corresponds with each service. In some embodiments, the discovery service and other services may be implemented as web services. The discovery service thus provides clients with a searchable means of finding services that they are interested in.

In some embodiments, the discovery service includes various data structures that help to describe individual services that may register with the discovery service. In particular embodiments, the various data structures may be represented by one or more XML elements. For example, a businessEntity element may be used to describe a business or organization that is offering services on a gaming network, including web services. A businessService element may be used to describe a collection of web services offered by the business. A bindingTemplate element may be used to describe the technical information necessary to communicate with a particular service. A tModel element may be used to describe unique concepts such as protocols used by the service. When a new service is created, such as a new web service in a gaming network, an administrator can programmatically call methods contained within the discovery service to publish the new service to the discovery service. Additionally, clients can query the discovery service using a variety of methods to find groups of services or a particular service that they are interested in. In some embodiments, these various methods may be UDDI methods. Once the client has found a particular service that it is interested in, the client can use the information returned from the discovery service to connect and bind to that service. By storing information for individual services in a central repository in the discovery service, clients only need to know the location of the discovery service in order to be able to connect and bind to all system wide services.

Figure 5A:
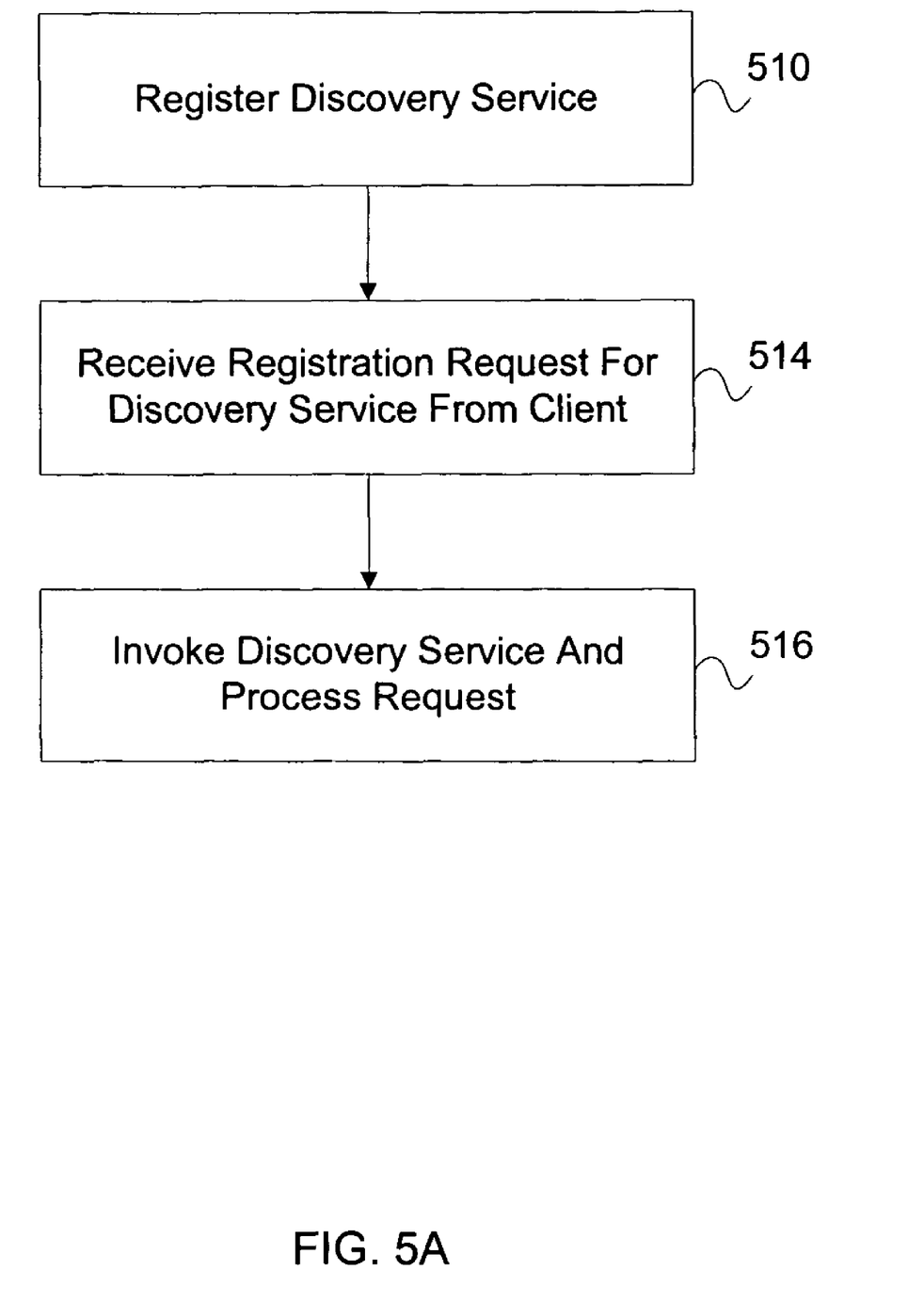
FIGS. 5A and 5B are flow diagrams illustrating methods and message flow for a providing a discovery service according to embodiments of the invention.
Figure 5B:
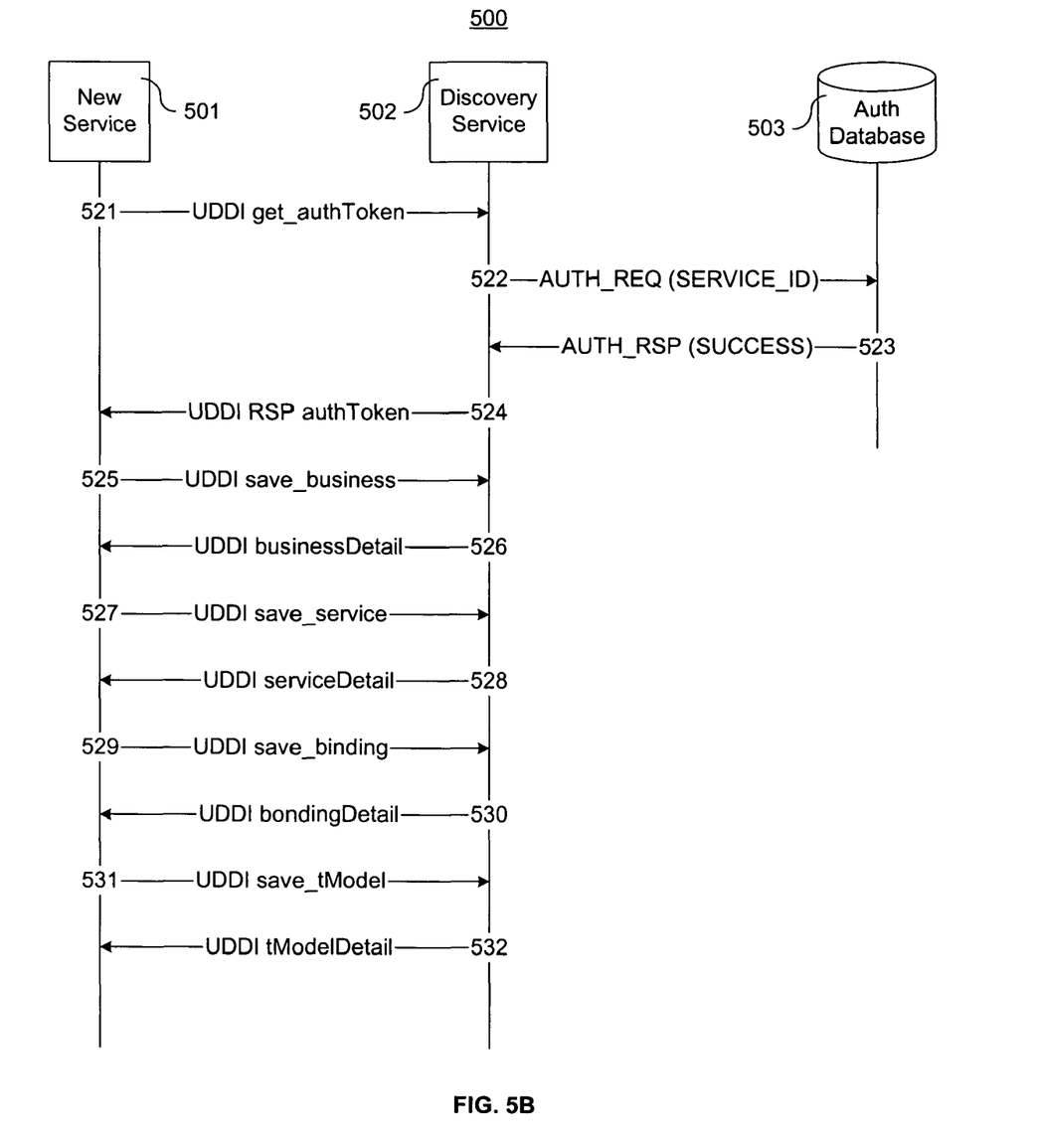

FIGS. 5A and 5B are flow diagrams illustrating methods for providing a discovery service according to embodiments of the invention. The methods may be performed within an operating environment such as that described above with reference to FIGS. 1-4. The methods to be performed by the operating environment constitute computer programs made up of computer-executable instructions. Describing the methods by reference to a flow diagram enables one skilled in the art to develop such programs including such instructions to carry out the methods on suitable computers (the processor of the computer executing the instructions from machine-readable media such as RAM, ROM, CD-ROM, DVD-ROM, flash memory etc.). The methods illustrated in FIGS. 5A and 5B are inclusive of the acts performed by an operating environment executing an exemplary embodiment of the invention.

FIG. 5A is a flow diagram illustrating a method for providing a discovery service in a service-oriented gaming network. In the detailed description of the method below, particular method names may be provided for particular embodiments of the invention. It should be noted that such names are exemplary in nature, and the present invention is not limited to any functionality that may be implied by the name.

The method begins when a discovery service registers on a gaming network (block 510). In some embodiments, the service is registered by creating an entry in a registry. In particular embodiments, the registry may be a UDDI registry. Once the registry is created, services can be added to the registry by when they publish new service information. In some embodiments, a new service calls UDDI methods in order to be published. The discovery service is then hosted on a server so that clients can access it. In some embodiments, the discovery service is hosted on a web server as a web service.

After the discovery service is registered, clients/service requestors may make discovery requests to obtain information on available services on the network. Typically the client will have embedded knowledge of the location of the discovery service. This may be accomplished by having the discovery service assigned to a well known address such as a particular URL, TCP/IP port or service name. Other mechanisms of embedding knowledge of the location of the discovery service are known in the art and within the scope of the present invention.

The client/service requestor can then register with the discovery service (block 514). In some embodiments, a client registers with the discovery service by calling a "get_authToken" method of the discovery service. This method call will return to the client a valid authorization token that the client can use when making subsequent method calls to the discovery service.

Once the client has successfully registered with the discovery service, it can invoke the discovery service by making various requests (block 516). In some embodiments, SOAP calls are issued to invoke discovery service request methods. In particular embodiments, the discovery service may include a combination of inquiry methods, publish methods, security policy methods, custody methods, subscription methods, and value set methods. In some embodiments, the inquiry methods may be used by a client to locate and gather details about the services that are stored within the discovery service, and may include one or more of the following methods:

| | |
|---|---|
| find_binding | Returns bindingDetail information for one or more services. |
| find_business | Used to retrieve all business information, including all services, for a particular business name. |
| find_relatedBusinesses | Used to locate information about all businesses that are related to a specific business. The client would pass in a specific business key to obtain this information. |
| find_service | Used to find a specific service or services. |
| find_tModel | Used to locate one or more technology model information structures. |
| get_bindingDetail | Used to obtain bindingDetail information for a service. |
| get_businessDetail | Used to get the businessDetail information for one or more businesses. |
| get_operationalInfo | Used to obtain an operationalInfos structures for one or more entities stored in the discovery service. |
| get_serviceDetail | Returns a serviceDetail structure for one or more services stored in the discovery service. |
| get_tModelDetail | Used to obtain the detail information for a registered technology model. |

In some embodiments, the publish methods are used by a client to publish and update information, including services, that are to be contained in the discovery service. The publish methods used in particular embodiments of the invention may include one or more of the following:

| | |
|---|---|
| add_publisherAssertions | Allows a client to add relationship assertions to the existing set of assertions. |
| delete_binding | Used to remove existing binding information from the discovery service. |
| delete_business | Used to delete an existing business and all its related detail information from the discovery service. |
| delete_publisherAssertions | Used to delete specific publisher assertions from the assertion collection of a particular publisher. |
| delete_service | Used to delete an existing service from the discovery service. |
| delete_tModel | Used to hide information about a technology model. |
| get_assertionStatusReport | Returns an assertionStatusReport that includes the status of all assertions made involving any business that is controlled by the requesting client. |
| get_publisherAssertions | Used to get a list of publisher assertions that are controlled by an individual publisher. |
| get_registeredInfo | Used to request an abbreviated list of businesses and technology models currently managed by a given publisher. |
| save_binding | Used to register new binding information or to update existing binding information. |
| save_business | Used to register new business information or update information for an existing business. This method is used to control the full set of business information, including all services and the corresponding binding information for each service. |
| save_service | Used to add a service and its detail information or update a service and any of its detail information. |
| save_tModel | Used to register or update information about a technology model. |
| set_publisherAssertions | Used to save the complete set of publisher assertions for an individual publisher. |

In some embodiments, the security policy methods are used by a client to obtain a new authorization token or to delete an existing authorization token. As an example, authorization tokens may be required for many method calls to the discovery service, including UDDI method calls. The security policy methods used in particular embodiments may include one or more of the following:

| | |
|---|---|
| discard_authToken | Used to inform a node that a previously obtained authentication token is no longer required and that the token is now invalid. |
| get_authToken | This method is used to obtain a new authentication token for the client. |

In some embodiments, the custody and ownership transfer methods allow a client that has published information to the discovery service to transfer ownership of that information to another client or publisher. The methods available in particular embodiments of the invention may include one or more of the following:

| | |
|---|---|
| get_transferToken | This method is used to initiate the transfer of custody of one or more businessEntity or tModel entities from one node to another. In some embodiments, no actual transfer takes place with this method call, but permissions are obtained via a transferToken to perform the transfer. |
| transfer_entities | This method may be used by publishers to whom custody is being transferred to actually perform the transfer. In some embodiments, the client must have an unexpired transferToken that was issued by the custodial node for the entities being transferred. |

In some embodiments, the subscription methods are used by a client to register with the discovery service and to allow the discovery service to notify the client when specific changes have been made to the discovery service registry. In some embodiments, the methods may include one or more of the following:

| | |
|---|---|
| delete_subscription | Allows the client to cancel one or more subscriptions. |
| get_subscriptionResults | Returns registry data pertaining to a particular subscription within a specified time period. Results may be returned synchronously in some embodiments. |
| get_subscriptions | Returns a list of existing subscriptions previously saved by the client. |
| save_subscription | Creates a new subscription or changes an existing one. |
| notify_subscriptionListener | The discovery service communicates with a calling client to notify the client of data that has changed in the discovery service registry since notify_subscriptionListener was last invoked for a particular subscription. |

In some embodiments, the value set methods are used to provide the ability for third parties to register value sets and then control the validation process used to perform such checks. For example, whenever a data element is saved, it may be checked to insure that it is valid. In particular embodiments, key reference elements (keyedReference) or keyed reference group elements (keyedReferenceGroup) may be checked using UDDI to insure validity. Also value checking may be performed for tModels that are deemed to be "checked", as determined by the policy of the discovery service registry. The methods used in some embodiments may include one or more of the following:

| | |
|---|---|
| validate_values | The discovery service may communicate with an external services to assess whether keyed references or keyed reference groups are valid. The external service may be a web service in some embodiments of the invention. |
| get_allValidValues | Used by nodes that support caching of valid values from cacheable checked value sets to obtain the set of valid values. |

FIG. 5B illustrates a method for a client to utilize a discovery service according to an embodiment of the invention and illustrates a usage scenario involving a message sequence 500. The message sequence 500 shown in FIG. 5B describes the method of a new service 501 registering itself with the discovery service 502. New service 501 may be any of the services described above, or additional services provided in a gaming network. The present invention is not limited to any particular service seeking to use a discovery service. Additional information for each message is provided below as defined by the block identification number in FIG. 5B. It is noted that the method is described in part with reference to UDDI and SOAP, however, no embodiment of the invention is limited to UDDI and/or SOAP, and other discovery and communications mechanisms may be used in place of UDDI and/or SOAP.

At 521, a new service 501 is ready to be deployed and requests an authorization token from the discovery service 502 (UDDI Registry).

At 522, the discovery service 502 authenticates the new service 501 with the authentication/authorization database 503. Examples of such authentication and authorization mechanisms include LDAP and RADIUS (Remote Authentication Dial-In User Service).

At 523, the authentication/authorization Database 503 successfully authenticates the new service 501 (e.g. using LDAP, RADIUS, et al.).

At 524, the discovery service 502 returns an authentication token to the new service 501. In some embodiments, the authentication token may be an authInfo element.

At 525, the new service 501 is now ready to publish itself with the discovery service 502 and in some embodiments calls the save_business method of the discovery service 502. The authentication token obtained in the previous step, may now be passed as an element in the save business method. In particular embodiments, an authInfo element is passed in a SOAP message call of the save_business method.

At 526, the new service 501 may receive a data structure providing business details from the discovery service 502. In particular embodiments, new service 501 receives a businessDetail XML structure from the discovery Service 502 in response to the save_business call.

At 527, the new service 501 provides service details to the discovery service. In some embodiments, the new service 501 calls the save_service method of the discovery service 502.

At 528, the new service 501 receives a data structure from the discovery Service 502 in response. In some embodiments, new service 501 receives a serviceDetail XML structure from the discovery service in response to the save_service call.

At 529, the new service 501 provides binding details to the discovery service 502. In some embodiments, the new service 501 calls the save_binding method of the discovery service 502.

At 530, the new service receives a binding detail data structure from discovery service 502 in response. In some embodiments, the New Service 501 receives a bindingDetail XML structure from the discovery service 502 in response to the save_binding call.

At 531, new service 501 may provide technology model details to the discovery service. In some embodiments, the new service 501 calls the save_tModel method of the discovery service 502.

At 532, new service 501 receives a data structure representing the model detail in response. In some embodiments, the new service 501 receives a tModelDetail XML structure from the discovery service 502 in response to the save_tModel call It should be noted that the above request/response sequence is but one possible sequence, and that variations in the sequence are possible and within the scope of the invention. For example, the order of requests may be altered in alternative embodiments, or certain requests and responses may be omitted in further alternative embodiments.

Conclusion

Systems and methods providing a discovery service in a service-oriented gaming network environment have been disclosed. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method for providing a discovery service to gaming machines in a gaming network, the method comprising:
   registering the discovery service on the gaming network;
   receiving by the discovery service from a service provider communicably coupled to the gaming network a request to publish service information for a service provided by the service provider;
   determining by the discovery service if the service provider is authentic and authorized for the gaming network;
   in response to determining that the service provider is authentic and authorized, publishing the service information into a service repository to make the service available on the gaming network;
   processing one or more discovery requests between a gaming machine communicably coupled to the gaming network and the discovery service, said service requests conforming to an internetworking protocol, wherein in response to the discovery requests the discovery service provides the service information to the gaming machine, and wherein the gaming machine is operable to depict indicia representative of a randomly selected outcome of a wagering game.

2. The method of claim 1, wherein the discovery service and the service comprises a web service.

3. The method of claim 2, wherein the service is specified according to a service description language.

4. The method of claim 3, wherein the service description language is a Web Services Description Language (WSDL).

5. The method of claim 1, wherein the discovery request comprises a request for business information for all services on the gaming network provided by a business specified in the discovery request.

6. The method of claim 1, wherein the discovery request comprises a request to find the service.

7. The method of claim 1, wherein the discovery request comprises a request to provide binding information for the service specified in the discovery request.

8. The method of claim 1, wherein the discovery request comprises a request from the service provider to delete service information from the discovery service.

9. The method of claim 1, wherein the discovery request comprises a request for a technology model associated with the service.

10. The method of claim 1, wherein the discovery request comprises a request to be notified of changes in the service provided by the service provider.

11. The method of claim 1, wherein registering the discovery service comprises registering the discovery service in a UDDI registry.

12. A gaming network system providing a discovery service, the gaming network system comprising:
    the discovery service communicably coupled to the gaming network;
    a service provider communicably coupled to the gaming network; and
    at least one gaming machine communicably coupled to the gaming network, the gaming machine operable to depict indicia representative of a randomly selected outcome of a wagering game;
    wherein the discovery service is operable to:
        register the discovery service on the gaming network;
        receive from the service provider a request to publish service information for a service provided by the service provider;
        determine if the service provider is authentic and authorized for the gaming network;
        in response to determining that the service provider is authentic and authorized, publish the service information into a service repository to make the service available on the gaming network; and
        process one or more discovery requests between the gaming machine communicably coupled to the gaming network and the discovery service, said service requests conforming to an internetworking protocol, wherein in response to the discovery requests the discovery service provides the service information to the gaming machine.

13. The gaming network system of claim 12, wherein the discovery service and the service provider comprises web services.

14. The gaming network system of claim 12, wherein the service is specified according to a service description language.

15. The gaming network system of claim 14, wherein the service description language is a Web Services Description Language (WSDL).

16. The gaming network system of claim 12, wherein the discovery request comprises a request for business information for all services on the gaming network provided by a business specified in the discovery request.

17. The gaming network system of claim 12, wherein the discovery request comprises a request to find a service.

18. The gaming network system of claim 12, wherein the discovery request comprises a request to provide binding information for a service specified in the discovery request.

19. The gaming network system of claim 12, wherein the discovery request comprises a request from the service provider to delete service information from the discovery service.

20. The gaming network system of claim 12, wherein the discovery request comprises a request for a technology model associated with a service.

21. The gaming network system of claim 12, wherein the discovery request comprises a request to be notified of changes in the service provided by the service provider.

22. The gaming network system of claim 12, further comprising an authentication database communicably coupled to the gaming network and wherein the discovery service is further operable to authenticate the service provider using the authentication database.

23. The gaming network system of claim 12, wherein registering the discovery service comprises registering the discovery service in a UDDI registry.

24. A non-transitory computer-readable medium having computer executable instructions for performing a method for providing a discovery service to gaming machines in a gaming network, the method comprising:
    registering the discovery service on the gaming network;
    receiving by the discovery service from a service provider communicably coupled to the gaming network a request to publish service information for a service provided by the service provider;
    determining by the discovery agent if the service provider is authentic and authorized for the gaming network;
    in response to determining that the service provider is authentic and authorized, publishing the service information into a service repository to make the service available on the gaming network;
    processing one or more discovery requests between a gaming machine communicably coupled to the gaming network and the discovery service, said service requests conforming to an internetworking protocol, wherein in response to the discovery requests the discovery agent provides the service information to the gaming machine, and wherein the gaming machine is operable to depict indicia representative of a randomly selected outcome of a wagering game.

25. The non-transitory computer-readable medium of claim 24, wherein the service communicates the service information to the discovery agent through the gaming network.

* * * * *